(No Model.)

C. T. CARNES.
CHURN.

No. 411,322. Patented Sept. 17, 1889.

Witnesses
Frank S. Ober
R. W. Bishop

Inventor
Charles T. Carnes
By his Attorneys

UNITED STATES PATENT OFFICE.

CHARLES T. CARNES, OF MARIETTA, GEORGIA.

CHURN.

SPECIFICATION forming part of Letters Patent No. 411,322, dated September 17, 1889.

Application filed April 3, 1889. Serial No. 305,849. (No model.)

*To all whom it may concern:*

Be it known that I, CHARLES T. CARNES, a citizen of the United States, residing at Marietta, in the county of Cobb and State of Georgia, have invented a new and useful Churn, of which the following is a specification.

My invention relates to improvements in churns; and it consists in certain novel features, hereinafter described and claimed.

Figure 1:
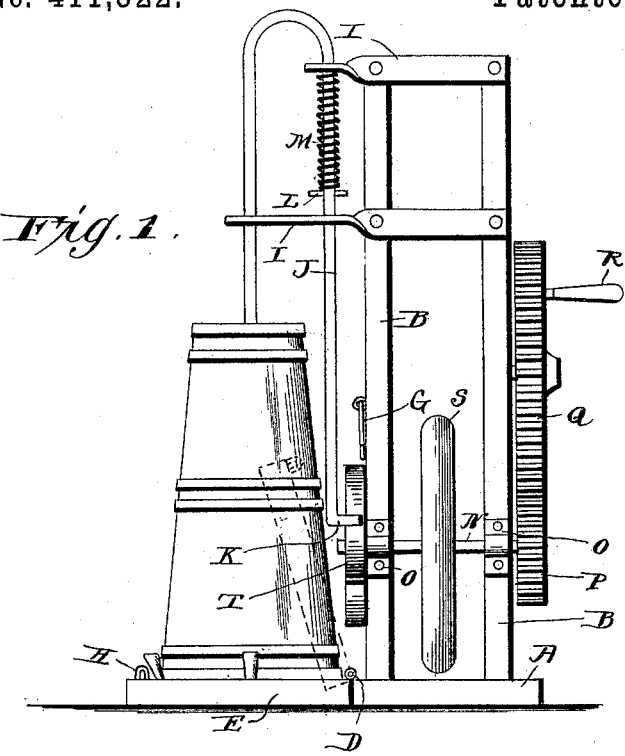
Figure 2:
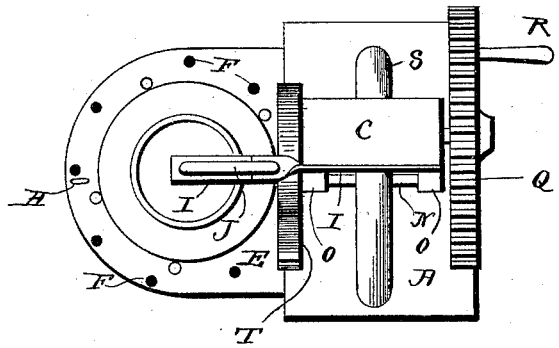
Figure 3:
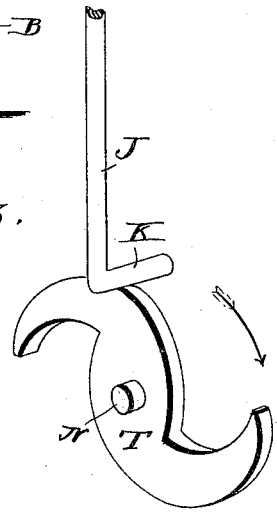

In the accompanying drawings, Figure 1 is a side view of a churn provided with my improvements. Fig. 2 is a top plan of the same, and Fig. 3 is a detail perspective view.

The frame of my improved churn consists of the base A, the standards B B, and the cross-bar C, connecting the upper ends of the standards, as shown. To one side of the base I secure, by a hinge D, a supporting plate or platform E, upon which the churn-body is placed when the device is in use, and the said platform is provided with a number of openings or sockets F, so that suitable pins may be inserted into the platform to hold the churn-body thereon when in use. When the device is not in use, this platform is swung upward, as shown in dotted lines in Fig. 1, so that the space occupied by the device will be lessened, and it is held in this raised position by means of a hook G, pivoted to the front standard B, and adapted to engage a staple H, secured on the edge of the platform.

I secure to the standards, at the top of the same and to a suitable distance below the top, the brackets or guide-arms I, which project forward from the standards, and are provided with eyes or perforations at their free ends, in which the U-shaped reciprocating bar J is mounted and plays. This U-shaped bar is provided at the lower end of its inner arm with a horizontal offset or shoulder K, which bears upon the actuating-cam, as will be presently more fully referred to, and between the two brackets I the inner arm of the said reciprocating bar is provided with a transverse pin L, and a coiled spring M is arranged around the said bar between the said pin L and the upper bracket. This spring holds the said bar normally downward and on the operating-cam. The dasher-rod is pivoted within a socket at the lower end of the outer arm of said bar, and the lower bracket I is projected forward, so as to form a guide for the said outer arm of the said bar, and thereby prevent the said rod rotating horizontally, and consequently causing the dasher to beat against the sides of the churn-body. The driving-shaft N is journaled in suitable bearings O, secured to the standards below the lower bracket I, and is provided on its rear end with a pinion P, which meshes with a gear-wheel Q, mounted on a stub-shaft projecting rearwardly from the standard, and provided with a crank-handle R. A fly-wheel S is secured on the driving-shaft between the standards, and the double cam or eccentric T is secured to the front end of the driving-shaft. This cam or eccentric bears directly against the lower end of the inner arm of the U-shaped reciprocating bar, as clearly shown.

In operation the cream is placed in the churn-body, the churn-body secured on the platform, as before described, and the driving-wheel rotated so as to rotate the driving-shaft, and thereby drive the cam or eccentric. The cam acts on the reciprocating bar so as to raise the same, and when the shoulder of the cam has cleared the lower end of the bar the spring at once throws the said bar downward into position to be again raised by the cam. A reciprocating motion is thus imparted to the churn-dasher and the cream quickly and thoroughly churned.

From the foregoing description it will be seen that I have provided a churn which is composed of a minimum number of parts, and those parts are simple in construction and can be operated easily and rapidly.

Having thus described my invention, what I claim, and desire to secure by Letters Patent, is—

The combination of the standards, the arms I I, secured to the same and projecting forward therefrom, the U-shaped bar mounted in said arms and having the dasher secured to the lower end of its outer arm, the inner arm being provided with a transverse pin and having an offset K at its lower end, the spring coiled around the inner arm of said bar between the transverse pin and the upper arm I, the driving-shaft mounted on the standards, the cam on the front end of said shaft bearing against the under side of the offset K, and gearing on the rear standard to rotate the driving-shaft, as specified.

In testimony that I claim the foregoing as my own I have hereto affixed my signature in presence of two witnesses.

CHARLES T. CARNES.

Witnesses:
JOHN D. WHITE,
C. C. WINN, Jr.